W. DOLENTY.
COMBINED CORN-MARKER AND COVERER.
No. 181,922. Patented Sept. 5, 1876.
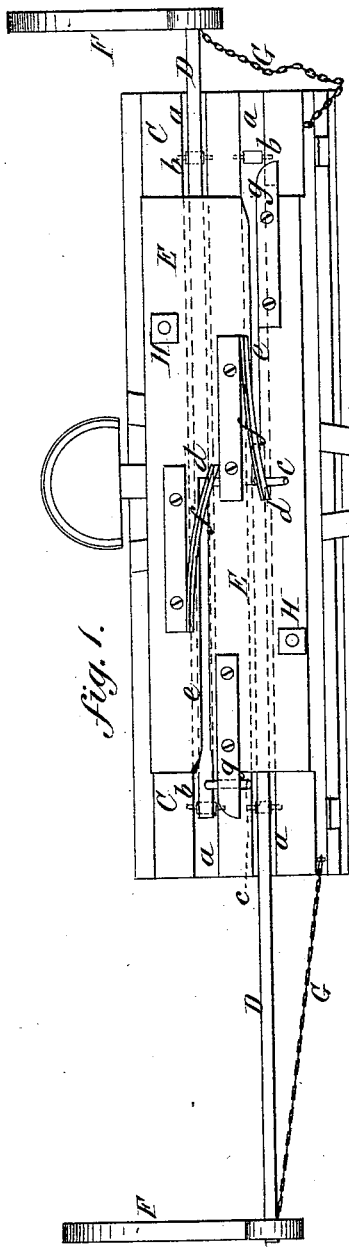
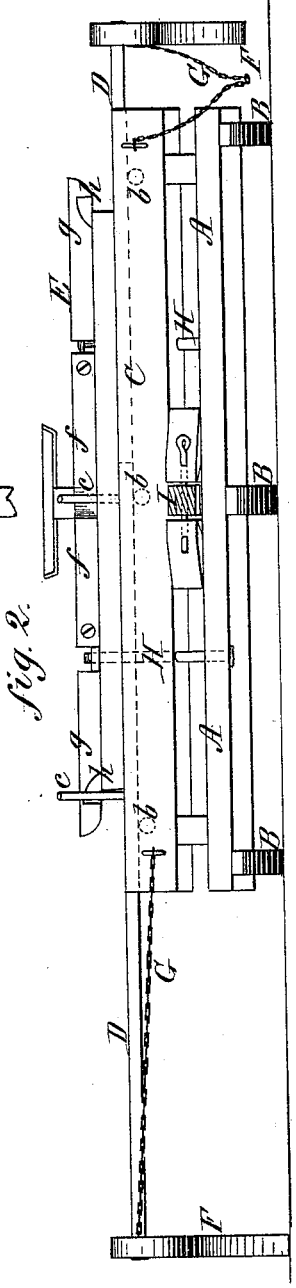
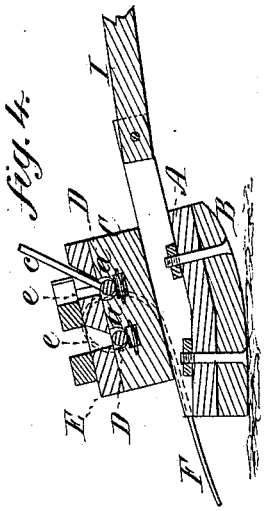
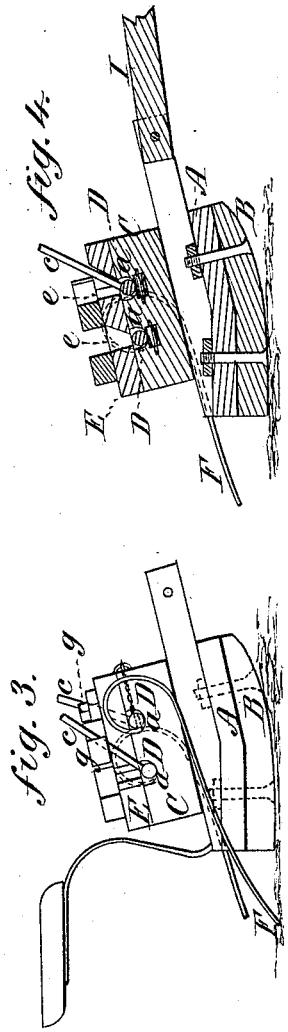
Witnesses:
Inventor:
pro William Dolenty
Johnson and Johnson
Att'ys

UNITED STATES PATENT OFFICE.

WILLIAM DOLENTY, OF INDEPENDENCE, IOWA.

IMPROVEMENT IN COMBINED CORN MARKER AND COVERER.

Specification forming part of Letters Patent No. 181,922, dated September 5, 1876; application filed March 21, 1876.

*To all whom it may concern:*

Be it known that I, WILLIAM DOLENTY, of Independence, in the county of Buchanan and State of Iowa, have invented new and useful Improvements in Combined Corn Marker and Coverer, of which the following is a specification:

My improved corn marker and coverer consists of a long, narrow frame, of an upper and lower section, and provided with sled-runners. The upper section carries in bed-grooves two horizontally-extensible slide-rods, to the outer ends of which spring-markers are secured for marking the rows for the corn. These marker-carrying slide-rods are arranged parallel to each other, and extend from opposite ends of the frame, so as to be slid in by each other when not in use, and turned so as to elevate and hold up their markers; and when extended for use these rods are locked, so as to hold the markers in contact with the surface of the ground. For this purpose a top board of the upper frame is provided with parallel longitudinal slots coincident with the bed-grooves, to receive arms projecting from the inner ends of the marker-rods, and which co-operate with locking notches and springs of said top board to hold the markers in action, and with notched holds to maintain the markers out of action when their slide-rods are drawn in.

The narrow frame is provided with a suitable tongue, by which it is drawn over the ground upon its runners, and a seat for the driver is arranged in the rear of the frame. The lower frame is beveled on its under side, whereby it is adapted as a coverer for the corn, in which case the runners are removed and the markers drawn in and turned up out of the way. A simple oblong frame, therefore, forms both a marker and coverer, and leaves the ground smooth, doing its work effectually, and, by a simple sled-like frame, made sufficiently long to cover three rows at a time.

In the accompanying drawings, Figure 1 represents a top view of the machine, showing one of the markers extended for use, and the other drawn in and turned, and supported up out of the way. Fig. 2 is a front elevation with the parts in the same positions; Fig. 3, an end view, and Fig. 4 a cross-section.

The runner-bed is a long, narrow platform, A, of two-inch plank, beveled or inclined upward from about the middle of its width toward the front, and provided with three or more runners, B, arranged crosswise, and made adjustable as to their distance apart, as may be desired.

An upper long, narrow frame, C, is secured to the runner-frame in any suitable manner, and carries the marking devices. These consist of two extensible rods, D, fitted into grooves $a$ in the top of the upper frame C, so as to be moved in or out, with their markers parallel to each other lengthwise of the frame. To admit of this movement the bed-grooves $a$ are arranged by the side of each other, so that the marker-rods D can be drawn in the whole length of the frame. These rods are cylindrical in cross-section, so as to allow them to be turned in their bed-grooves $a$, for a purpose to be presently described, and they are held in place by a cap-plate, E, the bed-groove being provided with rollers $b$, over and upon which the marker-rods slide when extended and drawn in. The outer end of each rod D is provided with a curved strap of spring-steel, F, about one and a half inch wide, and extending back in positions when turned down, with the rods extended to make guide-marks in the soil for the rows of corn. In these positions the rods are held by arms $c$ extending upward from their inner ends by interlocking with notches $d$, formed at the inner ends of long slots $e$, made in the cap-plate E, these arms being held in such notches $d$ by springs $f$, secured to the cap-plate, thereby holding the markers in proper positions when adjusted for use. When not in use, the rods are drawn into their bed-grooves their entire length, and turned by means of the handle-arms $c$, so as to lock the latter with a holding-bar, $g$, at each end of the top board, and thus elevate and hold up the markers, the arms being for that purpose moved far enough beyond the slots $e$ of the top plate to allow them to be turned to one side of the holding-bar $g$, and held by a notch, $h$, therein. To obtain these holds for the rod-arms $c$ the top plate E is of a slightly less length than the grooved bed C, and these arms $c$ form extensions of the slots $e$ in said bed.

In the extended positions of the marker-rods I brace them against the forward draft of the machine by chains G, connected to the machine and the outer ends of said bars. The top frame may be made removable, being secured for that purpose to the base runner by vertical screw-bolts H passing through both.

The machine thus described is adapted as a marker only, and to use the machine interchangeably as a coverer for the corn, the marker-rods D are drawn in and fastened by their arms c into the notched holders g at the ends of the top plate; or top plate, with its marker-arms, may be removed entirely, and the runners B are removed and the platform A used with its flat runner-surface as a coverer, and is sufficient to cover about forty acres of corn per day, thereby combining in one machine a simple coverer and marker. The tongue I is secured to the bed-runner in the middle of its length by front projecting hounds, to which it is pivoted. The spring-markers are coiled at their ends connected with the slide-rods to give sufficient elasticity for passing over obstructions and relieve their carrying-rods of all undue strain.

I claim—

1. The combination, with a long, narrow runner-bed, A, provided with runners B, of a supplemental top frame, C, carrying extensible markers, consisting of parallel rods D, arranged in bed-grooves, and provided with coil-spring markers E at their ends, whereby they may be extended and drawn in in the direction of their length, substantially as herein set forth.

2. The combination of the marker-rods D, provided with arms c at their inner ends, with the top plate E, provided with the slots e, notches d, and springs f, whereby the markers may be turned in their bed-grooves, extended and held in marking positions, substantially as herein set forth.

3. The combination of the marker-rods D, provided with arms c at their inner ends, with holding notched arms g at the ends of the grooved top plate E, whereby the marker-arms c may be turned to bring and secure their spring-markers in elevated positions when not in use, substantially as herein set forth.

4. The grooved bed C for the marker-rods D, in combination with the top plate E, having slots e coincident with the bed-grooves, and provided with interlocking and holding appliances, to either maintain the markers in their working positions or when drawn in out of use.

In testimony whereof I have affixed my signature in the presence of two witnesses.

WILLIAM DOLENTY.

Witnesses:
JAMES B. DONNAN,
J. C. LOOMIS.